United States Patent
Redbrandt et al.

(10) Patent No.: US 9,109,647 B2
(45) Date of Patent: Aug. 18, 2015

(54) DEVICE AND METHOD FOR CONTROL OF A MOTOR VEHICLE'S PROPULSION

(75) Inventors: Karl Redbrandt, Solna (SE); Andreas Laghamn, Södertälje (SE); Fredrik Petersson, Södertälje (SE); Mikael Wågberg, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/239,942

(22) PCT Filed: Aug. 29, 2012

(86) PCT No.: PCT/SE2012/050916
§ 371 (c)(1),
(2), (4) Date: Feb. 20, 2014

(87) PCT Pub. No.: WO2013/032395
PCT Pub. Date: Mar. 7, 2013

(65) Prior Publication Data
US 2014/0236442 A1 Aug. 21, 2014

(30) Foreign Application Priority Data
Aug. 31, 2011 (SE) ...................................... 1150787

(51) Int. Cl.
*F16D 48/06* (2006.01)
*B60W 10/02* (2006.01)
(Continued)

(52) U.S. Cl.
CPC ............... *F16D 48/06* (2013.01); *B60W 10/02* (2013.01); *B60W 10/06* (2013.01); *B60W 10/30* (2013.01);
(Continued)

(58) Field of Classification Search
CPC ....................................................... F16D 48/06
USPC ........................ 701/67, 68; 477/167, 174, 180
See application file for complete search history.

(56) References Cited

U.S. PATENT DOCUMENTS

| 5,056,639 A | 10/1991 | Petzold et al. ............. 192/0.076 |
| 5,293,316 A | 3/1994 | Slicker ....................... 364/424.1 |

(Continued)

FOREIGN PATENT DOCUMENTS

| DE | 38 31 449 A1 | 3/1990 |
| EP | 0 139 277 A1 | 5/1985 |

(Continued)

OTHER PUBLICATIONS

International Search Report mailed Oct. 12, 2012 in corresponding PCT International Application No. PCT/SE2012/050916.

(Continued)

*Primary Examiner* — Edwin A Young
(74) *Attorney, Agent, or Firm* — Ostrolenk Faber LLP (57) ABSTRACT

A method, a device and a computer program for control of a motor vehicle's propulsion. When a clutch torque (Req T) is demanded by a driver activating of an accelerator pedal, the degree of closure (G) of the vehicle's clutch actuator is controlled by feedback on the basis of a monitored engine torque. There is at least one further consumer (290) of engine power in addition to propulsion. The method includes detecting (s410) activation of the at least one further consumer and, when such activation is detected, changing (s420) the feedback control to open control, whereby the degree of closure (G) of the vehicle's clutch actuator is based on a predetermined relationship between the degree of closure (G) and the clutch torque (Req T).

16 Claims, 4 Drawing Sheets (51) Int. Cl.
*B60W 10/06* (2006.01)
*B60W 10/30* (2006.01)
*B60W 30/188* (2012.01)
*B60W 50/00* (2006.01)

(52) U.S. Cl.
CPC ....... *B60W 30/1886* (2013.01); *B60W 30/1888* (2013.01); *B60W 2050/0008* (2013.01); *B60W 2050/0012* (2013.01); *B60W 2510/0225* (2013.01); *B60W 2510/305* (2013.01); *B60W 2540/10* (2013.01); *B60W 2710/022* (2013.01); *B60W 2710/027* (2013.01); *F16D 2500/1112* (2013.01); *F16D 2500/3144* (2013.01); *F16D 2500/70258* (2013.01)

(56) References Cited

U.S. PATENT DOCUMENTS

| 6,770,010 | B2* | 8/2004 | Matsumura et al. | 477/124 |
|---|---|---|---|---|
| 2002/0019295 | A1* | 2/2002 | Kobayashi et al. | 477/174 |
| 2005/0278104 | A1 | 12/2005 | Masuda et al. | 701/69 |
| 2007/0005211 | A1* | 1/2007 | Katsumata et al. | 701/67 |
| 2009/0098978 | A1* | 4/2009 | Lee et al. | 477/62 |
| 2010/0268427 | A1* | 10/2010 | Kabrich | 701/55 |
| 2010/0324790 | A1 | 12/2010 | Wurthner et al. | 701/54 |
| 2011/0196590 | A1* | 8/2011 | Ayabe et al. | 701/68 |

FOREIGN PATENT DOCUMENTS

| EP | 0 585 817 A1 | 3/1994 |
|---|---|---|
| EP | 1 354 751 A2 | 10/2003 |
| JP | 2007-16887 | 1/2007 |
| JP | 2009-210110 | 9/2009 |
| KR | 10-1993-0007708 | 5/1993 |
| KR | 10-2006-0049538 | 5/2006 |

OTHER PUBLICATIONS

Korean Office Action issued in Korean Patent Application No. 10-2014-7008585 dated Mar. 5, 2015 with an English translation.
Japanese Office Action, dated Feb. 17, 2015, issued in corresponding Japanese Patent Application No. 2014-528330. English translation. Total 2 pages.

* cited by examiner

DEVICE AND METHOD FOR CONTROL OF A MOTOR VEHICLE'S PROPULSION

CROSS-REFERENCE TO RELATED APPLICATIONS

The present application is a 35 U.S.C. §§371 national phase conversion of PCT/SE2012/050916, filed Aug. 29, 2012, which claims priority of Swedish Patent Application No. 1150787-8, filed Aug. 31, 2011, the contents of which are incorporated by reference herein. The PCT International Application was published in the English language.

TECHNICAL FIELD

The present invention relates to a method for control of a motor vehicle's propulsion wherein a clutch torque is demanded by a driver by activation of an accelerator pedal. The degree of closure of the vehicle's clutch actuator is controlled by feedback on the basis of a monitored engine torque and there is at least one further consumer of engine power in addition to the propulsion.

The invention relates also to a computer program product containing program code for a computer to implement a method according to the invention.

The invention relates also to a device for control of a motor vehicle's propulsion, comprising means for demanding clutch torque by activation of an accelerator pedal and means for using feedback to control the degree of closure of the vehicle's clutch actuator on the basis of a monitored engine torque, there being at least one further consumer of engine power in addition to said propulsion, and to a motor vehicle equipped with the device.

BACKGROUND

In today's vehicles it is usual for a driver of a motor vehicle with a so-called two-pedal system to use an accelerator pedal to demand a clutch torque for propulsion of said vehicle. When the vehicle is being set in motion, the position of the clutch actuator is regulated automatically on the basis of torque feedback so that the clutch torque substantially becomes that demanded by the driver. It is here assumed that the torque generated by the vehicle's engine substantially corresponds to that which the clutch transmits in the vehicle's power train.

This type of strategy causes uneasiness in vehicles with variable engine load caused by power take-off upstream of the clutch in the power train. This uneasiness is due to the position of the clutch actuator being regulated with a view to the engine torque being moved towards a set-point value. The clutch actuator's position will change in response to an unknown disturbance of the engine. This may cause drivers in certain applications with high requirements for precision driving to feel that the vehicle is not behaving in a desirable way. This is due to the clutch torque transmitted not being the same as the engine torque in applications where the engine is subject to irregular loads. If such loads become too great, e.g. when running a powerful AC unit or using power take-off, the driver may see this as a real problem in cases where precision driving is required.

If the load due to a power take-off increases in a vehicle of the kind indicated above, the engine torque will automatically increase, causing an on-board control system to open the clutch somewhat in order to lower the clutch torque towards the set-point value. This means that the force driving the powered wheels decreases and the vehicle's speed is reduced when moving off. Similar problems arise when the load due to the power take-off decreases while the vehicle is moving off, in that the engine torque automatically decreases and the clutch closes somewhat, which may cause a jerk in the power train.

An example of an application where there are problems is where the vehicle is of the so-called hook loader type and precision driving is desirable. A hook loader does for example make it possible to load a container onto the vehicle, without the container being dragged along a sensitive surface, by the driver using precision driving to back in under said container which is held up by the hook loader. It is desirable that the vehicle behave in a predictable way during such operations.

If the vehicle is a hook loader with a so-called three-pedal system, the driver may use the accelerator pedal to speed up the engine, and the clutch pedal to move the vehicle. This results in very good manoeuvrability. In vehicles with two-pedal systems, the driver is deprived of the possibility of precision movement of the vehicle in a desirable way if the clutch actuator's position is no longer predictable, as in applications with variable loads upon the engine upstream of the clutch.

U.S. Pat. No. 5,056,639 describes a device and a method for controlling an automatic vehicle clutch.

EP 1354751 describes a device for controlling a process of setting in motion a motor vehicle with a transmission.

US 20100324790 describes a method for controlling a power train of a motor vehicle.

SUMMARY OF THE INVENTION

There is a need for a method for propulsion of a motor vehicle which reduces the above disadvantages in applications which require precision driving while at the same time there is a variable load upstream of the clutch.

An object of the present invention is to propose a novel and advantageous method for control of a motor vehicle's propulsion.

Another object of the invention is to propose a novel and advantageous device and a novel and advantageous computer program for control of a motor vehicle's propulsion.

A further object of the invention is to propose a method, a device and a computer program for effecting an alternative control of a motor vehicle's propulsion.

A further object of the invention is to propose a method, a device and a computer program for control of a motor vehicle's propulsion whereby the maneuverability available to a driver is improved during states of variable load upon the vehicle's engine.

These objects are achieved with a method for control of a motor vehicle's propulsion whereby a clutch torque is demanded by a driver by activation of an accelerator pedal, the degree of closure of the vehicle's clutch actuator is controlled by feedback on the basis of a monitored engine torque and there is at least one further consumer of engine power in addition to said propulsion.

An aspect of the invention proposes a method for control of a motor vehicle's propulsion wherein a clutch torque is demanded by a driver by activation of the accelerator pedal, the degree of closure of the vehicle's clutch actuator is controlled by feedback on the basis of a monitored engine torque and there is at least one further consumer of engine power in addition to said propulsion. The method comprises the steps of detecting activation of the at least one further consumer, and, when such activation is detected, changing the feedback control to open control whereby the degree of closure of the vehicle's clutch actuator is based on a predetermined relationship between the degree of closure and the clutch torque, which clutch torque is demanded by the driver by activation of the accelerator pedal.

The result is a method whereby a driver of the vehicle will feel substantially the same precision in the vehicle's propulsion as in ordinary operation, despite the transmission of the engine's torque by the clutch being disturbed by a variable load (power take-off by consumers). This means that a driver of the vehicle will not experience loss of control or irritation due to unpredictable behaviour of the vehicle during states or applications in which the engine is subject to variable load.

The invention achieves a method for control of a motor vehicle's propulsion which makes better precision movement possible, particularly at low vehicle speeds. The method is advantageous during slow movement of the vehicle when slipping of the clutch is required.

The present invention is advantageous in the case of a vehicle equipped with a so-called two-pedal system for operating it. Where there is no conventional clutch pedal, an aspect of the invention enables a driver in a definitely controllable way to operate said vehicle with high precision. It should also be noted that drivers are thus enabled to achieve precision movement of the vehicle in situations of variable load upon the engine.

The method may further comprise the steps of
detecting deactivation of said further consumer and, when such deactivation is detected,
changing said open control to said feedback control.

The result is a robust method for control of a motor vehicle's propulsion. According to an aspect of the present invention, the vehicle is only run with open control when said at least one further consumer is activated. According to the invention, switching between open control and feedback control may be effected in such a way that drivers will not notice. The invention thus achieves a user-friendly and predictable method.

The method may further comprise the step of
continuously updating empirically said relationship between said degree of closure and the clutch torque. This has the effect of continuously optimising said relationship. The result is a method which in a very reliable way makes open control according to the invention possible when said at least one further consumer is in operation.

Said at least one further consumer may be any from among a hydraulic pump, an AC unit or a power take-off. It may be any suitable consumer. It may be a consumer which loads the vehicle's engine. It may be a consumer which uses power generated by the vehicle's engine upstream of a clutch in the power train. The result is a method applicable in different vehicle configurations which may have unique sets of consumers upstream of the clutch in the power train.

Said activation of said at least one further consumer may be effected manually, with signaling to an on-board control unit. A driver or operator of the vehicle may thus for example use a changeover switch to activate said at least one consumer. Said consumer may form part of a hook loader device with which the vehicle is provided.

The method is easy to implement in existing motor vehicles. Software for control of a motor vehicle's propulsion whereby a clutch torque is demanded by a driver by activation of an accelerator pedal, the degree of closure of the vehicle's clutch actuator is controlled by feedback on the basis of a monitored engine torque and there is at least one further consumer of engine power in addition to said propulsion may be installed in a control unit of the vehicle during the manufacture of the vehicle. A purchaser of the vehicle may thus have the possibility of selecting the function of the method as an option. Alternatively, software which contains program code for applying the innovative method may be installed in a control unit of the vehicle on the occasion of upgrading at a service station, in which case the software may be loaded into a memory in the control unit. Implementing the innovative method is therefore cost-effective, particularly as no further sensors or other components need be installed in the vehicle according to an aspect of the invention. Relevant hardware is currently already provided on board the vehicle. The invention therefore represents a cost-effective solution to the problems indicated above.

Software containing program code for control of a motor vehicle's propulsion whereby a clutch torque is demanded by a driver by activation of an accelerator pedal, the degree of closure of the vehicle's clutch actuator is controlled by feedback on the basis of a monitored engine torque and there is at least one further consumer of engine power in addition to said propulsion is easy to update or replace. Different parts of the software containing program code for applying the innovative method may also be replaced independently of one another. This modular configuration is advantageous from a maintenance perspective.

An aspect of the invention proposes a device for control of a motor vehicle's propulsion, comprising means for demanding clutch torque by activation of an accelerator pedal, and means for feedback control of the degree of closure of the vehicle's clutch actuator on the basis of a monitored engine torque, there being at least one further consumer of engine power in addition to said propulsion. The device comprises
means for detecting activation of said at least one further consumer, and
means, when such activation is detected, for changing said feedback control to open control whereby the degree of closure of the vehicle's clutch actuator is based on a predetermined relationship between said degree of closure and the clutch torque, which clutch torque is demanded by the driver by a activation of an accelerator pedal.

The device may further comprise
means for detecting deactivation of said further consumer, and
means, when such deactivation is detected, for changing said open control to said feedback control.

The device may further comprise means for continuously updating empirically said relationship between said degree of closure and the clutch torque.

Said at least one further consumer may be any from among a hydraulic pump, an AC unit or another power take-off. According to an aspect of the invention, said consumer may take the form of a loading device, e.g. a loading crane of a hook loader.

The device may further comprise means for manually activating said at least one further consumer, with signaling to an on-board control unit.

The above objects are also achieved with a motor vehicle provided with the device. The vehicle may be a truck, bus or car.

An aspect of the invention is a proposed computer program for control of a motor vehicle's propulsion whereby a clutch torque is demanded by a driver by activation of an accelerator pedal, the degree of closure of the vehicle's clutch actuator is controlled by feedback on the basis of a monitored engine torque and there is at least one further consumer of engine power in addition to the propulsion, which program contains program code stored on a computer-readable medium for causing an electronic control unit or another computer connected to the electronic control unit to perform steps according to the disclosure.

An aspect of the invention is a proposed computer program for control of a motor vehicle's propulsion wherein a clutch torque is demanded by a driver by activation of an accelerator pedal. The degree of closure of the vehicle's clutch actuator is controlled by feedback on the basis of a monitored engine torque and there is at least one further consumer of engine power in addition to the propulsion, which program contains program code for causing an electronic control unit or another computer connected to the electronic control unit to perform steps in the disclosure.

An aspect of the invention is a proposed computer program product containing a program code stored on a computer-readable medium for performing method steps disclosed herein when the program is run on an electronic control unit or another computer connected to the electronic control unit.

Further objects, advantages and novel features of the present invention will become apparent to one skilled in the art from the following details, and also by applying the invention. Although the invention is described below, it should be noted that it is not limited to the specific details described. One skilled in the art who has access to the teachings herein will recognise further applications, modifications and incorporations within other fields, which are within the scope of the invention.

BRIEF DESCRIPTION OF THE DRAWINGS

Fuller understanding of the present invention and further objects and advantages of it may be gathered by reading the following detailed description in conjunction with the accompanying drawings, in which the same reference notations pertain to similar parts in the various diagrams, and in which.

DETAILED DESCRIPTION OF THE DRAWINGS

Figure 1:
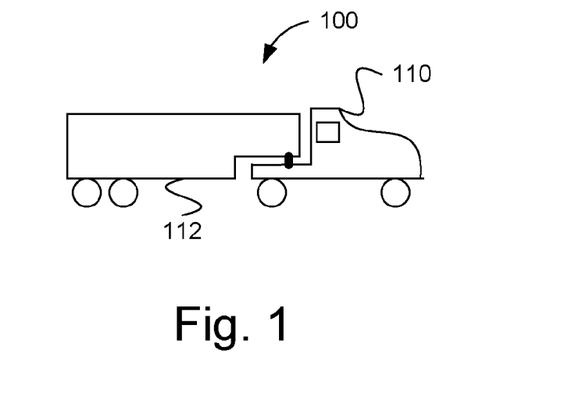
FIG. 1 illustrates schematically a vehicle according to an embodiment of the invention.

FIG. 1 depicts a side view of a vehicle 100. The vehicle exemplified comprises a tractor unit 110 and a semitrailer 112. The vehicle may be a heavy vehicle, e.g. a truck or a bus. The vehicle may alternatively be a car.

The term "link" refers herein to a communication link which may be a physical line such as an opto-electronic communication line, or a non-physical line such as a wireless connection, e.g. a radio link or microwave link.

Figure 2:
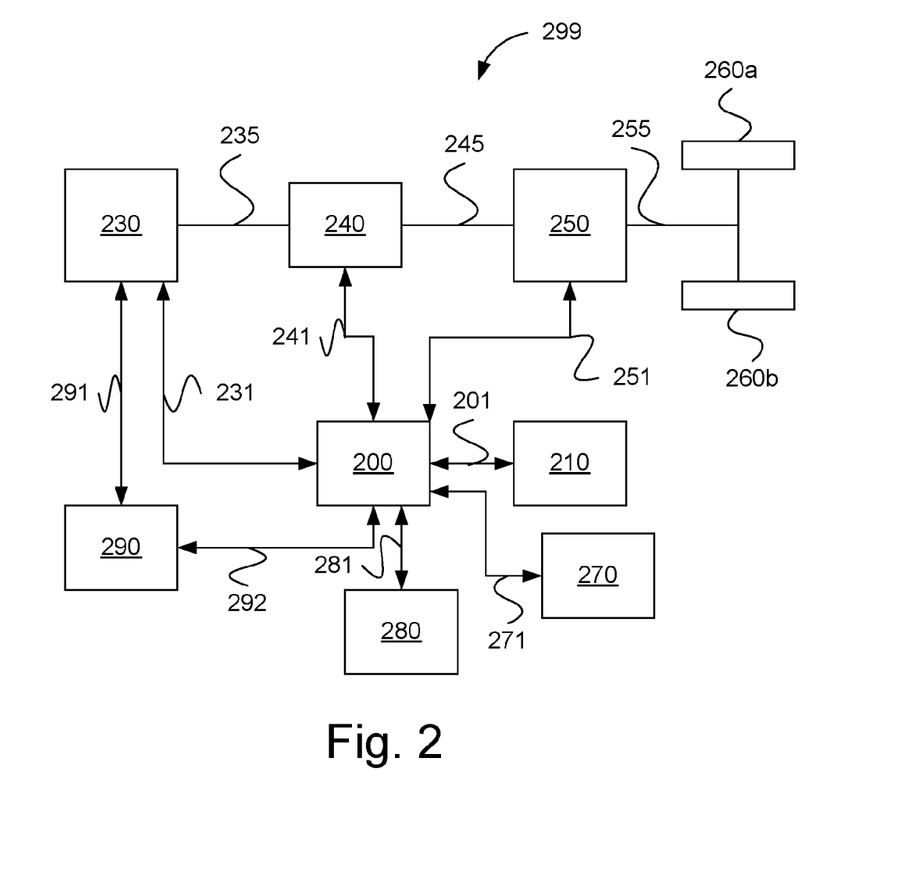
FIG. 2 illustrates schematically a subsystem for the vehicle depicted in FIG. 1, according to an embodiment of the invention.

FIG. 2 depicts a subsystem 299 of the vehicle 100. The subsystem is situated in the tractor unit 110. The tractor unit is equipped with a two-pedal system for operating the vehicle. The subsystem comprises a combustion engine 230 which may be a diesel engine.

The engine 230 has an output shaft 235 connected to a clutch 240 which may be of friction type. The clutch may comprise two discs whose relative position is herein called the degree of closure G.

A clutch actuator (not depicted) is provided to act upon the clutch 240 in such a way that a desirable torque is transmitted through the clutch in the power train to propel said vehicle. The degree of closure G of the clutch actuator is defined by a range between 100% (full transfer of torque by the clutch) and 0%.

The clutch 240 has an output shaft 245 connected to a gearbox 250. The gearbox has an output shaft 255 adapted to driving at least two powered wheels 260a and 260b. Torque generated by the engine 230 can be transmitted via the shaft 235, the clutch 240, the shaft 245, the gearbox 250 and the shaft 255 to the powered wheels 260a and 260b.

A first control unit 200 is arranged for communication with the engine 230 via a link 231. The first control unit is arranged for communication with the clutch 240 via a link 241. The first control unit is arranged for communication with the gearbox 250 via a link 251. The first control unit is adapted to controlling the operation of the engine 230. The first control unit is adapted to controlling the operation of the clutch 240, i.e. by acting upon the clutch actuator's degree of closure G in a desirable way. The first control unit is adapted to controlling the operation of the gearbox 250, e.g. by applying a gear ratio in the gearbox.

A second control unit 210 is arranged for communication with the first control unit 200 via a link 201. The second control unit 210 may be detachably connected to the first control unit 200. The second control unit 210 may be a control unit external to the vehicle 100. The second control unit may be adapted to effecting the innovative method steps according to the invention. The second control unit 210 may be used to cross-load software to the first control unit 200, particularly software for effecting the innovative method. The second control unit may alternatively be arranged for communication with the first control unit 200 via an internal network on board the vehicle. The second control unit 210 may be adapted to performing substantially similar functions to those of the first control unit 200, e.g. detecting activation of said at least one further consumer and, when such activation is detected, changing said feedback control to open control whereby the degree of closure of the vehicle's clutch actuator is based on a predetermined relationship between said degree of closure and the clutch torque, which clutch torque is demanded by the driver by a activation of an accelerator pedal.

The engine 230 is adapted to powering at least one consumer 290. The consumer may be a power take-off. The consumer is adapted to being powered by the engine via a line 291. The first control unit 200 is arranged for communication with the consumer 290 via a link 292. The first control unit may be adapted to controlling the operation of the consumer. The consumer may be adapted to automatically sending a signal which contains information that it has been activated or deactivated. The first control unit 200 is adapted to receiving said signals from the consumer in order thereby to detect whether the consumer has been activated or deactivated.

The first control unit 200 is adapted to continuously updating empirically said relationship between the clutch actuator's degree of closure and the clutch torque. Said relationship is described in more detail with reference to FIG. 3.

Said at least one further consumer 290 may be any from among a hydraulic pump, an AC unit or another power take-off.

The subsystem 299 comprises a two-pedal system comprising a conventional acceleration control 270, e.g. an accelerator pedal, and a brake pedal. The acceleration control is signal-connected to the first control unit 200 via a link 271. The driver can use the acceleration control 270 to demand a desired clutch torque Req T. The vehicle's propulsion can by means of the acceleration control be controlled by the driver on the basis of a clutch torque demanded by him/her by activation of an accelerator pedal.

The subsystem 299 further comprises a clutch device 280 signal-connected to the first control unit 200 via a link 281. A driver can use the clutch device 280 to manually activate and deactivate operation of the consumer 290. Operating the clutch device 280 generates a signal which contains information that the consumer has been activated or deactivated, which signal is sent to the first control unit 200 from the clutch device 280.

Figure 3:
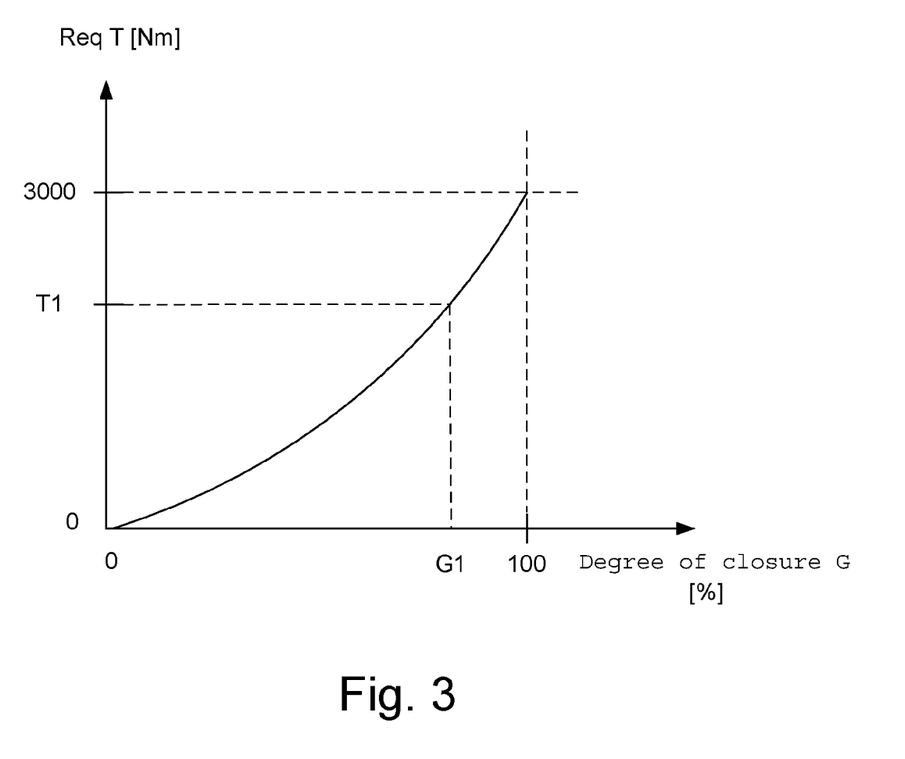
FIG. 3 is a graph of a clutch torque as a function of a degree of closure of a clutch, according to an embodiment of the invention.

FIG. 3 illustrates schematically a relationship between the clutch actuator's degree of closure G and a clutch torque Req T demanded by a driver, according to an aspect of the invention. The graph in FIG. 3 refers to a state of the vehicle when running with open control, i.e. without feedback as described in the introduction. This example pertains to a moving-off procedure for the vehicle.

A model describing how said degree of closure G depends on said clutch torque Req T demanded is stored in a memory in the first control unit 200.

In this example the clutch 240 is fully closed (clutch actuator's degree of closure G 100%) when the demanded torque Req T is 3000 Nm. In a case where the driver demands a clutch torque T1, the position of the clutch actuator is set such that the degree of closure becomes G1, causing a certain torque to be transmitted in the power train through the clutch 240.

The demanded clutch torque Req T when the degree of closure G is 100% may of course be any suitable clutch torque Req T. Setting the value for Req T corresponding to a degree of closure G of 100% may be done on the basis of vehicle-specific parameters and thus be appropriate to the particular vehicle.

The relationship between the demanded clutch torque Req T and the clutch actuator's degree of closure G may be any suitable relationship. According to an embodiment it may be adjusted during suitable operating states of the vehicle in order to continuously optimise said relationship. Said adjustment preferably takes place during running of the vehicle when the clutch is slipping. Said adjustment preferably takes place when the vehicle is running with feedback control of the clutch actuator's degree of closure G. According to the invention, said adjustment is advantageous in that continuous adaptation to prevailing wear of the clutch is thus performed.

Figure 4A:
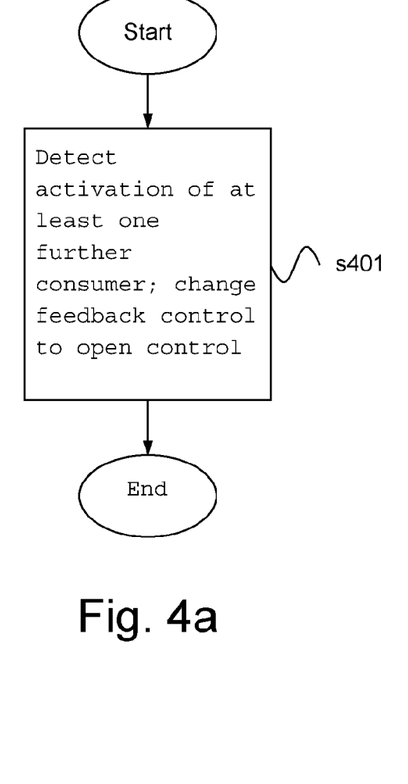
FIG. 4a is a schematic flowchart of a method according to an embodiment of the invention.

FIG. 4a is a schematic flowchart of a method for control of a motor vehicle's propulsion whereby a clutch torque Req T is demanded by a driver by using the accelerator pedal 270, the degree of closure G of the vehicle's clutch actuator is controlled by feedback on the basis of a monitored engine torque and there is at least one further consumer 290 of engine power in addition to said propulsion, according to an embodiment of the invention.

The method comprises a first step s401 comprising the steps of
  detecting activation of said at least one further consumer 290,
  and, when such activation is detected, changing said feedback control to open control whereby the degree of closure of the vehicle's clutch actuator is based on a predetermined relationship between said degree of closure G and the clutch torque Req T, which clutch torque Req T is demanded by the driver by a activation of an accelerator pedal. The method ends after step s401.

Figure 4B:
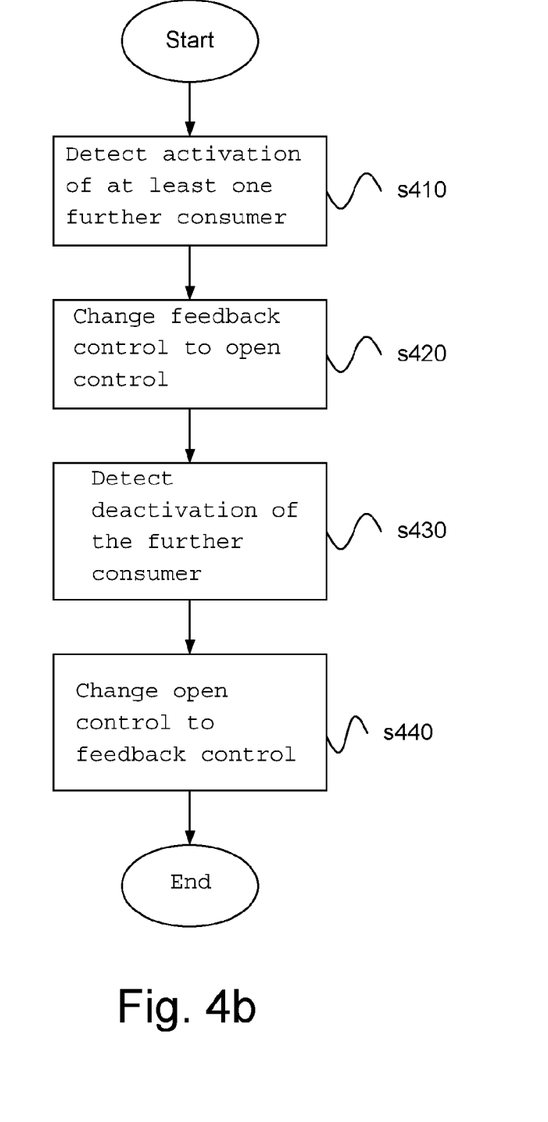
FIG. 4b is a more detailed schematic flowchart of a method according to an embodiment of the invention.

FIG. 4b is a more detailed schematic flowchart of a method for control of a motor vehicle's propulsion whereby a clutch torque Req T is demanded by a driver by using the accelerator pedal 270, the degree of closure G of the vehicle's clutch actuator is controlled by feedback on the basis of a monitored engine torque and there is at least one further consumer 290 of engine power in addition to said propulsion, according to an embodiment of the invention.

The method comprises a first step s410 comprising the step of detecting activation of said at least one further consumer 290. This activation may be effected automatically or manually. It may be effected in any suitable way, e.g. by the consumer automatically sending to the first control unit 200 via the link 292 a signal which contains information that the consumer has been activated. Alternatively, a driver or other operator may use the clutch device 280 to manually generate to the first control unit 200 via the link 281 a signal containing information that the consumer has been activated. Step s410 is followed by a step s420.

Method step s420 comprises the step, after activation has been detected at step s410, of changing said feedback control to open control whereby the clutch actuator's degree of closure G is based on a predetermined relationship between said degree of closure G and the clutch torque Req T, which clutch torque Req T is demanded by the driver by using the accelerator pedal 270. Routines for controlling the vehicle's propulsion by feedback, and routines for running the vehicle with open control, are stored in the first control unit 200. Step s420 is followed by a step s430.

Method step s430 comprises the step of detecting deactivation of said at least one further consumer 290. This deactivation may be effected automatically or manually. It may be effected in any suitable way, e.g. by the consumer automatically sending to the first control unit 200 via the link 292 a signal which contains information that the consumer has been deactivated. Alternatively, a driver or other operator may use the clutch device 280 to manually generate to the first control unit 200 via the link 281 a signal containing information that the consumer has been deactivated. Step s430 is followed by a step s440.

Method step s440 comprises the step, after deactivation has been detected at step s430, of changing said open control to said feedback control. The method ends after step s440.

Figure 5:
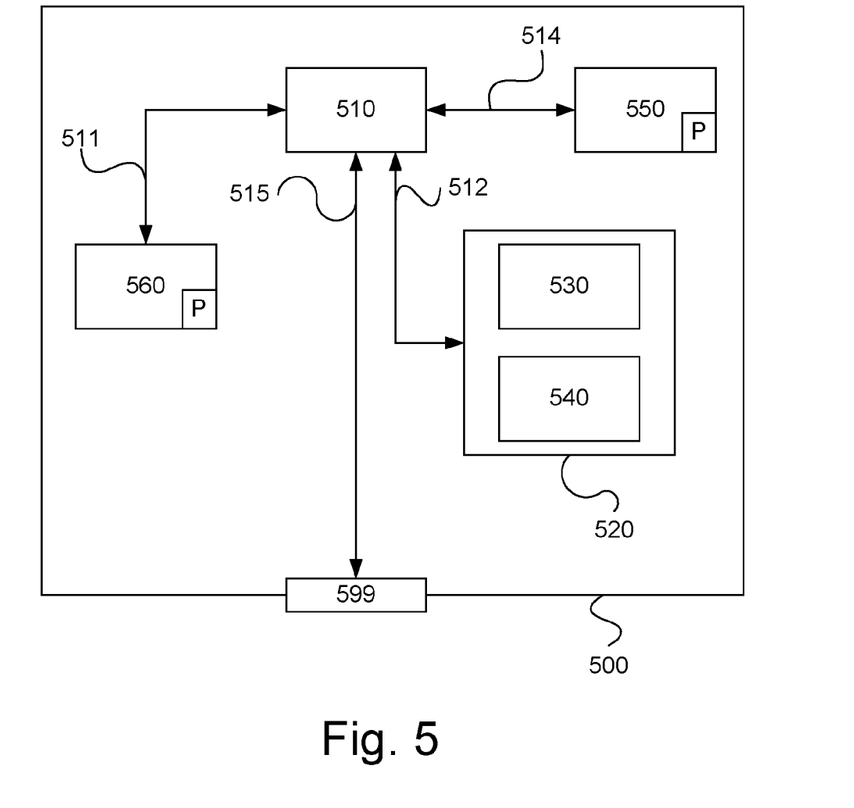
FIG. 5 illustrates schematically a computer according to an embodiment of the invention.

FIG. 5 is a diagram of a version of a device 500. The control units 200 and 210 described with reference to FIG. 2 may in a version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A proposed computer program P comprises routines for detecting activation of said at least one further consumer and, when said activation is detected, for changing said feedback control to open control whereby the degree of closure of the vehicle's clutch actuator is based on a predetermined relationship between said degree of closure and the clutch torque, the clutch torque being demanded by the driver by activation of an accelerator pedal, according to the innovative method.

The program P comprises routines for detecting deactivation of said further consumer and, when said deactivation is detected, for changing said open control to said feedback control.

The program P comprises routines for continuously updating empirically said relationship between said degree of closure and the clutch torque, in accordance with the innovative method.

The program P may be stored in an executable form or in compressed form in a memory 560 and/or in a read/write memory 550.

Where it is stated that the data processing unit 510 performs a certain function, it means that the data processing unit 510 effects a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is intended to communicate with the data processing unit 510 via a data bus 514. The data port 599 may for example be connected to the links 201, 231, 241, 251, 271, 281 and 292 (see FIG. 2).

When data are received on the data port 599, they are stored temporarily in the second memory element 540. When input data received have been temporarily stored, the data processing unit 510 will be ready to effect code execution in a manner described above. According to a version, signals received on the data port 599 contain information that activation of a consumer 290 has been detected. According to a version, signals received on the data port 599 contain information that deactivation of a consumer 290 has been detected. The signals received on the data port 599 may be used by the device 500 to change feedback control of the vehicle's propulsion to open control whereby the degree of closure of the vehicle's clutch actuator is based on a predetermined relationship between said degree of closure and the clutch torque, the clutch torque being demanded by the driver by a activation of an accelerator pedal. The signals received on the data port 599 may be used by the device 500 to change open control of the vehicle's propulsion to feedback control.

Parts of the methods herein described may be applied by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order best to explain the principles of the invention and its practical applications and hence to make it possible for one skilled in the art to understand the invention for various embodiments and with the various modifications appropriate to the intended use.

The invention claimed is:

1. A method for control of a motor vehicle's propulsion comprising:
   demanding a degree of clutch torque of a clutch of the vehicle by activating an engine accelerator and producing engine torque to propel the vehicle;
   controlling a degree of closure of a clutch actuator based on feedback based on a monitored engine torque of the vehicle;
   selectively activating at least one further consumer of engine power in addition to propulsion of the vehicle;
   detecting activation of the at least one further consumer;
   and when such activation is detected, changing the feedback control to an open control, wherein the degree of closure of the vehicle's clutch actuator is based on a predetermined relationship between the degree of closure and the clutch torque, wherein the clutch torque is demanded by the driver by activation of the engine accelerator.

2. A method according to claim 1, further comprising the steps of
   detecting deactivation of the at least one further consumer and, when deactivation is detected;
   changing the open control to the feedback control.

3. A method according to claim 2, further comprising the step of continuously updating empirically the relationship between the degree of closure and the clutch torque.

4. A method according to claim 2, in which the at least one further consumer is any from among a hydraulic pump, an AC unit or a power take-off.

5. A method according to claim 2, in which the activation of the at least one further consumer is effected manually, with signalling to a control unit on board the vehicle.

6. A computer program for control of a motor vehicle's propulsion whereby a clutch torque is demanded by a driver by activation of an accelerator, a degree of closure of the vehicle's clutch actuator is controlled by feedback on the basis of a monitored engine torque, and there is at least one further consumer of engine power in addition to propulsion of the vehicle; wherein
   the computer program contains program code stored on a non-transitory medium, and the program is for causing an electronic control unit or another computer connected to the electronic control unit to perform steps according to claim 1.

7. A computer program product containing a program code stored on a non-transitory computer-readable medium for performing method steps according to claim 1 when the computer program is run on an electronic control unit or another computer connected to the electronic control unit.

8. The method according to claim 1, wherein the clutch torque is demanded by the driver of the vehicle activating an accelerator pedal of the vehicle.

9. A device for control of a motor vehicle's propulsion, comprising:
   a clutch actuator configured for demanding clutch torque, and a device configured for controlling a degree of closure of the vehicle's clutch actuator by feedback on the basis of a monitored engine torque of the vehicle;
   at least one further consumer of engine power in addition to propulsion of the vehicle;
   a detector configured for detecting activation of the at least one further consumer; and
   a control unit configured such that when such activation of the at least one further consumer is detected, the feedback control is changed to an open control, whereby the degree of closure of the vehicle's clutch actuator is based on a predetermined relationship between the degree of closure and the clutch torque, wherein the clutch torque is demanded by a driver activating the engine's accelerator.

10. A device according to claim 9, further comprising:
a device configured for detecting deactivation of the further consumer; and
a device configured such that, when the deactivation is detected, the open control is changed to the feedback control.

11. A device according to claim 10, further comprising:
an update device for continuously updating empirically the relationship between the degree of closure and the clutch torque.

12. A device according to claim 9, in which the at least one further consumer is any from among a hydraulic pump, an AC unit or a power take-off.

13. A device according to claim 9, further comprising an actuator configured for manually activating the at least one further consumer, with signalling to the control unit on board the vehicle.

14. A motor vehicle comprising a device according to claim 9.

15. A motor vehicle according to claim 14, wherein the vehicle is any from among a truck, a bus or a car.

16. The device according to claim 9, wherein the clutch torque is demanded by the driver by activating an accelerator pedal of the vehicle.

* * * * *